US008772645B2

(12) United States Patent
Hwang et al.

(10) Patent No.: US 8,772,645 B2
(45) Date of Patent: Jul. 8, 2014

(54) TOUCH PANEL AND DISPLAY DEVICE INCLUDING SAME

(71) Applicant: LG Chem, Ltd., Seoul (KR)

(72) Inventors: Ji Young Hwang, Daejeon (KR); In-Seok Hwang, Daejeon (KR); Sang Ki Chun, Daejeon (KR); Yong Goo Son, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/972,487

(22) Filed: Aug. 21, 2013

(65) Prior Publication Data

US 2013/0334017 A1 Dec. 19, 2013

Related U.S. Application Data

(63) Continuation of application No. PCT/KR2012/011400, filed on Dec. 24, 2012.

(30) Foreign Application Priority Data

Dec. 23, 2011 (KR) ........................ 10-2011-0141746

(51) Int. Cl.
*H05K 1/11* (2006.01)
*H01H 1/58* (2006.01)

(52) U.S. Cl.
CPC .................................. *H01H 1/5805* (2013.01)
USPC ........................................... 174/261; 361/749

(58) Field of Classification Search
CPC .......... G06F 2203/04103; G06F 3/041; G06F 3/0412; H01H 1/5805

USPC .......... 174/254, 256, 257, 261; 361/749–751; 427/68, 271, 278

See application file for complete search history.

(56) References Cited

U.S. PATENT DOCUMENTS

| 2006/0274055 A1* | 12/2006 | Reynolds et al. ............. 345/174 |
| 2007/0117048 A1* | 5/2007 | Yoo et al. ...................... 430/302 |
| 2010/0085326 A1* | 4/2010 | Anno ............................. 345/174 |
| 2010/0177055 A1* | 7/2010 | Ookawara et al. ............ 345/173 |
| 2011/0134055 A1* | 6/2011 | Jung et al. ..................... 345/173 |
| 2012/0033172 A1* | 2/2012 | Chang et al. .................. 349/187 |
| 2013/0069898 A1 | 3/2013 | Park et al. |

FOREIGN PATENT DOCUMENTS

| KR | 10-2009-0048002 | 5/2009 |
| KR | 10-2009-0050762 | 5/2009 |
| KR | 2009-0048002 | 5/2009 |
| KR | 2009-0050762 | 5/2009 |
| KR | 10-2011-0063223 | 6/2011 |
| KR | 10-2011-0070158 | 6/2011 |
| KR | 2011-0063223 | 6/2011 |
| KR | 2011-0070158 | 6/2011 |
| KR | 10-2011-0107449 | 10/2011 |
| KR | 2011-0107449 | 10/2011 |

* cited by examiner

*Primary Examiner* — Yuriy Semenenko
(74) *Attorney, Agent, or Firm* — McKenna Long & Aldridge LLP (57) ABSTRACT

The present invention relates to a touch panel, comprising a screen part, a router part, a flexible printed circuit board (FPCB) part, a first pad part comprising two or more router connection regions connecting the screen part and the router part, and a second pad part comprising two or more FPCB connection regions connecting the router part and the flexible printed circuit board (FPCB) part, in which at least some regions of the two or more FPCB connection regions comprise a conductive pattern having opening regions.

20 Claims, 6 Drawing Sheets

Figure 1

<Microphotograph of Cliche>

<Microphotograph of Conductive Pattern>

TOUCH PANEL AND DISPLAY DEVICE INCLUDING SAME

This application is a bypass continuation of International Application No. PCT/KR2012/011400, filed Dec. 24, 2012, which claims priority to Korean Patent Application No. 10-2011-0141746, filed on Dec. 23, 2011, in the Korean Intellectual Property Office, all of which are incorporated herein by reference.

TECHNICAL FIELD

The present invention relates to a touch panel and a display apparatus comprising the same.

BACKGROUND ART

Recently, as distribution of smart phones, and tablet PCs, IPTVs, and the like has accelerated, requirement for a touch function in which a hand of human directly becomes an input device without a separate input device such as a keyboard or a remote controller has gradually increased. Further, a writable multi-touch function has been additionally required in addition to a specific point touch function.

The touch panel having the functions may be classified as follows according to a signal detecting method.

That is, the touch panels are divided into a resistive type detecting a position pressed by a pressure through a change in a current or voltage value in a state where DC voltage is applied, a capacitive type using capacitance coupling in a state where AC voltage is applied, and an electromagnetic type detecting a selected position as a change in voltage in a state where a magnetic field is applied.

Among the types, the most common resistive type and capacitive type touch panels recognize a touch or not according to an electrical touch or a change of capacitance by using a transparent conductive film such as an ITO film. However, the transparent conductive film almost has high resistance of 150 ohm/square or more, and sensitivity when increasing a size deteriorates. In addition, as a size of a screen is increased, costs of the ITO film increase, and as a result, commercialization is not easy. In order to solve the problem, an attempt to implement a large size by using a metal pattern having high conductivity has been performed.

When the touch panel is formed by the metal pattern, a minute pattern is provided on a screen part, while a conductive pattern needs to be provided in a relatively wide region of a pad part for connection with a power source. Accordingly, in the case of using a photolithography method in order to form the screen part and the pad part at once, a lot of costs are consumed, and in the case of using a printing method, a pattern having a desired shape is not formed due to a touch of a print roll on the bottom. In order to overcome the problem, a method of forming the screen part and the pad part by different processes has been attempted, but there is a problem in that the processes are complicated and a lot of costs are consumed.

DETAILED DESCRIPTION OF THE INVENTION

Technical Problem

In other to solve the aforementioned problems in the related art, the present invention is directed to a method of simply manufacturing a screen part and a pad part of a touch panel at a low price, after a lot of researches.

Technical Solution

An exemplary embodiment of the present invention provides a touch panel, comprising: a screen part; a router part; a flexible printed circuit board (FPCB) part; a first pad part comprising two or more router connection regions connecting the screen part and the router part; and a second pad part comprising two or more FPCB connection regions connecting the router part and the flexible printed circuit board (FPCB) part, in which at least some regions of the two or more FPCB connection regions comprise a conductive pattern having opening regions.

Further, another exemplary embodiment of the present invention provides a display apparatus comprising the touch panel.

Advantageous Effects

In the present invention, since all the FPCB connection regions connecting a router part and a flexible printed circuit board (FPCB) part are not coated with a conductive material, but constituted by a conductive pattern having opening regions, the router part and the flexible printed circuit board (FPCB) part may be formed together with the screen part by a printing method by one process. As a result, the touch panel may be provided at low costs and by a simple process.

Further, in the present invention, the entire FPCB connection region is not coated with the conductive material and configured with the conductive pattern having the opening region, and as a result, adhesion when attaching the touch panel and the FPCB part according to the present invention may be more excellently improved.

BEST MODE

Hereinafter, the present invention will be described in more detail.

A touch panel according to the present invention comprises a screen part, a router part, a flexible printed circuit board (FPCB) part, a first pad part comprising two or more router connection regions connecting the screen part and the router part, and a second pad part comprising two or more FPCB connection regions connecting the router part and the flexible printed circuit board (FPCB) part, in which at least some regions of the two or more FPCB connection regions comprise a conductive pattern having opening regions.

Hereinafter, although the description of the conductive pattern or the conductive substrate is not divided into the description relating to a touch panel comprising one conductive substrate where conductive patterns are provided on one side or both sides of a transparent base and the description relating to a touch panel comprising a transparent base and a conductive substrate comprising a conductive pattern where are laminated with two layers, the description relating to the conductive pattern or the conductive substrate may be applied to all exemplary embodiments of the touch panel according to the present invention unless otherwise noted.

Figure 6:
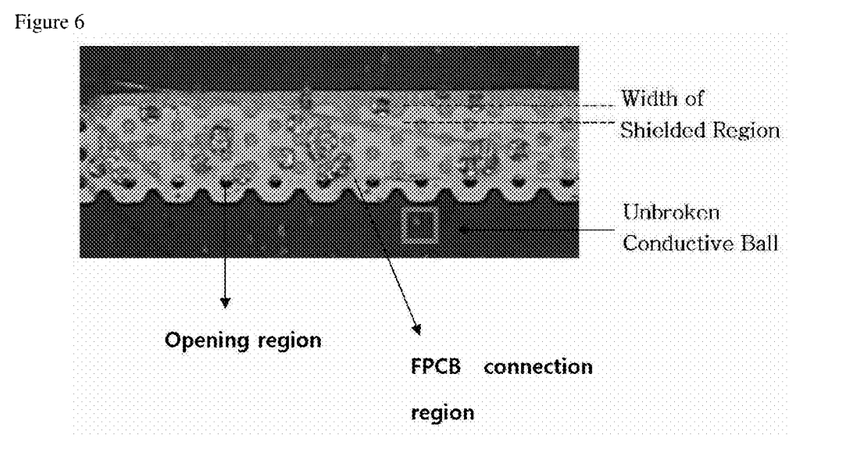

In the touch panel according to the present invention, a ratio of the opening regions in the two or more FPCB connection regions may be 10 to 99%, but is not limited thereto. However, since it is preferable that a width of a region corresponding to a shielded region is larger than a size (size before breaking) of a conductive ball of an anisotropic conductive film (ACF) from the viewpoint of a touch, after a line width of the shielded region is set to be larger than the size (size before breaking) of the conductive ball comprised in the ACF according to a size (size before breaking) of the conductive ball comprised in the ACF, those skilled in the art may select and use an opening area corresponding to the set line width, or inversely, select and use the ACF comprising the conductive ball corresponding to the line width or less corresponding to a determined ratio of the opening area (see FIG. 6). In general, when analyzed from the viewpoint of this, it may be preferable that the FPCB connection region is designed so that an opening area is in the range of approximately 20 to 70%.

Accordingly, in the present invention, the touch panel further comprises an anisotropic conductive film (ACF) connecting the FPCB connection region and the flexible printed circuit board (FPCB) part and comprising a conductive ball, and the shortest distance between the opening regions in the FPCB connection region or the shortest width of the shielded region may be equal to or larger than a maximum size of the conductive ball.

Figure 5:
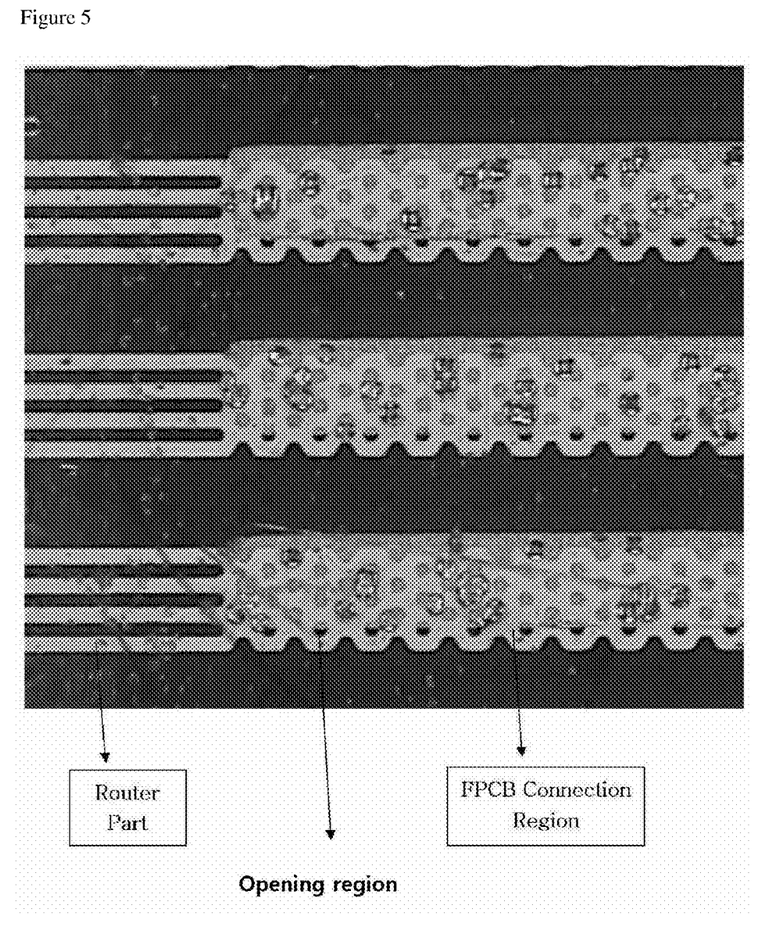
FIGS. 5 and 6 are diagrams illustrating the second pad part of the touch panel according to the exemplary embodiment of the present invention.

A shape of the opening region may be a closed figure constituted by a straight line, a curved line, a wave line, a zigzag line, and the like, and may be a closed figure in which at least two kinds of lines are mixed. Further, the shape of the opening region may be a polygon, a circle, and the like, but is not limited thereto. FIG. 5 illustrates a second pad part of the touch panel according to the exemplary embodiment of the present invention.

In the touch panel according to the present invention, at least some regions of the two or more router connection regions may comprise a conductive pattern having opening regions. A ratio of the opening regions in the two or more router connection regions may be 10 to 99%, but is not limited thereto. A shape of the opening region may be a closed figure constituted by a straight line, a curved line, a wave line, a zigzag line, and the like, and may be a closed figure in which at least two kinds of the lines are mixed. Further, the shape of the opening region may be a polygon, a circle, and the like, but is not limited thereto.

In the touch panel according to the present invention, the screen part may comprise a first conductive pattern, the router part and the first pad part may comprise a second conductive pattern, and the second pad part may comprise a third conductive pattern.

In the touch panel according to the present invention, at least a part of the second conductive pattern may have a different line width from the first conductive pattern, and at least a part of the third conductive pattern may have a different line width from the first conductive pattern.

In more detail, a line width of at least a part of the second conductive pattern may be larger than a line width of the first conductive pattern. For example, a difference in a line width between at least a part of the second conductive pattern and the first conductive pattern may be 5 micrometers or more, may be 15 micrometers or more, may be 30 micrometers or more, and may be 100 micrometers or less.

Further, a line width of at least a part of the third conductive pattern may be larger than a line width of the first conductive pattern. For example, a difference in a line width between at least a part of the third conductive pattern and the first conductive pattern may be 5 micrometers or more, may be 15 micrometers or more, may be 30 micrometers or more, and may be 100 micrometers or less.

In the touch panel according to the present invention, the first conductive pattern, the second conductive pattern, and the third conductive pattern may be formed by a printing method. As a detailed example, the conductive patterns may be formed on a transparent base by a reverse offset printing method or a gravure printing method. In addition, after an etching resist is formed on a base with a conductive layer by a reverse offset printing method or a gravure offset printing method, the conductive patterns may be formed by etching the conductive layer by using the formed etching resist. In the present invention, for pattern precision, the reverse offset printing method is more preferable.

According to an exemplary embodiment of the present invention, as described above, a width and a depth of a pattern of a cliche used in the printing method may be controlled in order to manufacture two kinds or more of conductive patterns having different line widths by one process. According to an exemplary embodiment, the conductive patterns may be formed by one process by controlling a relationship between the width and the depth of the pattern in the cliche having the same depth of the pattern. According to another exemplary embodiment, a cliche comprising two or more regions having different depths of the pattern may be used, and in this case, the conductive pattern may be formed by one process by using a cliche having a depth of an appropriate pattern according to a width of a desired pattern. The cliche may be acquired by double etching.

As one example, in the present invention, as a cliche comprising a grooved pattern, the cliche featuring that the grooved pattern comprises a region constituted by linear patterns which do not cross each other, and the region constituted by the linear patterns, as a square region comprising two or more lines of the linear pattern in the region, comprises a region where a line width W and a depth D of the linear pattern, a ratio R of a region without the linear patterns in the square region, and an opening line width W0 of a mask pattern for forming a pattern corresponding to the linear pattern satisfy the following Formulas 1 and 2 may be used.

$$W = 2D + W0 + X \quad \text{[Formula 1]}$$

$$D \geq 42.9 \exp(-R/0.35) - 1.5 \quad \text{[Formula 2]}$$

Here, X is a constant,
D, W, W0, and X are values having a micrometer unit, and R is a value of more than 0 to less than 1.

In this case, in the square region, the line width W and a pitch P of the linear pattern, and the ratio R of the region without the linear patterns in the square region may additionally satisfy the following Formula 3.

$$R = P(P-W)/P2 = (P-W)/P \quad \text{[Formula 3]}$$

Here, W, P and X are values having a micrometer unit, and R is a value of more than 0 to less than 1.

The linear pattern may be a regular or irregular pattern, and the linear pattern may comprise a straight line, a curved line, a zigzag line, or a combination thereof.

In the cliche, the region satisfying the Formulas 1 and 2 may be 50% or more of the entire grooved pattern region.

In the case where the cliche comprises two or more different patterns, the two or more patterns have the same depth D, and the depth D may satisfy Formulas 1 and 2 based on a pattern having the smallest ratio R of the region without the linear pattern.

In the case where the cliche comprises two or more different patterns, the two or more patterns comprise two or more regions having different depths D, and the two or more regions having different depths D of the pattern may satisfy Formulas 1 and 2, respectively. The cliche may be manufactured by double etching.

As another example, in the present invention, as a cliche comprising a grooved pattern, the cliche featuring that the grooved pattern comprises a region constituted by a mesh pattern, and the region constituted by the mesh pattern, a square region comprising three or more cross points of lines configuring the mesh pattern in the region, comprises a region where a line width W and a depth D of the mesh pattern, a ratio R of a region without the mesh pattern in the square region, and an opening line width W0 of a mask pattern for forming a pattern corresponding to the mesh pattern satisfy the following Formulas 1 and 4 may be used.

$$W=2D+W0+X \quad \text{[Formula 1]}$$

$$D \geq 33.8\exp(-R10.235)+0.82 \quad \text{[Formula 4]}$$

Here, X is a constant,
D, W, W0, and X are values having a micrometer unit, and R is a value of more than 0 to less than 1.

In the square region, the line width W and a pitch P of the mesh pattern, and the ratio R of the region without the mesh pattern in the square region may additionally satisfy the following Formula 5.

$$R=(P-W)2/P2=(1-W/P)2 \quad \text{[Formula 5]}$$

Here, W, P, and X are values having a micrometer unit, and R is a value of more than 0 to less than 1.

The mesh pattern may be a regular or irregular pattern, and the region satisfying the Formulas 1 and 4 may be 50% or more of the entire grooved pattern region.

The grooved pattern comprises two or more different patterns in the square region, the two or more patterns have the same depth D, and the depth D may satisfy Formulas 1 and 4 based on a pattern having the smallest ratio R of the region without the linear pattern.

In the case where the cliche comprises two or more different patterns, the two or more patterns comprise two or more regions having different depths D, and the two or more regions having different depths D of the pattern may satisfy Formulas 1 and 4, respectively. The cliche may be manufactured by double etching.

As another example, in the present invention, as a cliche comprising a grooved pattern, the cliche featuring that the grooved pattern comprises a region constituted by a mesh pattern and a segmented pattern of the mesh pattern, and the region, as a square region comprising three or more cross points of lines configuring the mesh pattern in the region, comprises a region where a line width W and a depth D of the mesh pattern, a ratio R of a region without the mesh pattern and the segmented pattern of the mesh pattern in the square region, and an opening line width W0 of a mask pattern for forming a pattern corresponding to the mesh pattern and the segmented pattern of the mesh pattern satisfy the following Formulas 1 and 4 may be used.

$$W=2D+W0+X \quad \text{[Formula 1]}$$

$$D \geq 33.8\exp(-R10.235)+0.82 \quad \text{[Formula 4]}$$

Here, X is a constant,
D, W, W0, and X are values having a micrometer unit, and R is a value of more than 0 to less than 1.

Here, the segmented pattern of the mesh pattern means a pattern where the mesh pattern is modified by disconnection.

In the square region, the line width W and a pitch P of the mesh pattern and the segmented pattern of the mesh pattern, and the ratio R of the region without the mesh pattern and the segmented pattern of the mesh pattern in the square region may additionally satisfy the following Formula 5.

$$R=(P-W)2/P2=(1-W/P)2 \quad \text{[Formula 5]}$$

Here, W, P, and X are values having a micrometer unit, and R is a value of more than 0 to less than 1.

In the cliche, the region satisfying the Formulas 1 and 4 may be 50% or more of the entire grooved pattern region.

The grooved pattern of the cliche may comprise linear patterns which do not cross each other, a mesh pattern, or both the linear patterns and the mesh pattern.

In the touch panel according to the present invention, the first conductive pattern may comprise a conductive line having a line width of 20 micrometers or less, and may comprise a conductive line having a line width of 15 micrometers or less, 10 micrometers or less, 7 micrometers or less, 4 micrometers or less, or 3 micrometers or less. In the present invention, the line width of the conductive line may be controlled in the range of 0.5 to 10 micrometers. An aperture ratio of the third conductive pattern, that is, an area ratio of the transparent base which is not covered by the pattern is preferably 70% or more, and may be 90% or more, 93% or more, 95% or more, 96% or more, 97% or more, 98% or more, or 99% or more.

In the present invention, a line height of the first conductive pattern may be 0.01 micrometer to 1 micrometer, 1 micrometer to 2 micrometers, 2 micrometers to 5 micrometers, 5 micrometers to 10 micrometers, or 10 micrometers or more, and those skilled in the art may select the line height according to a use, a process, or a material.

Figure 1:
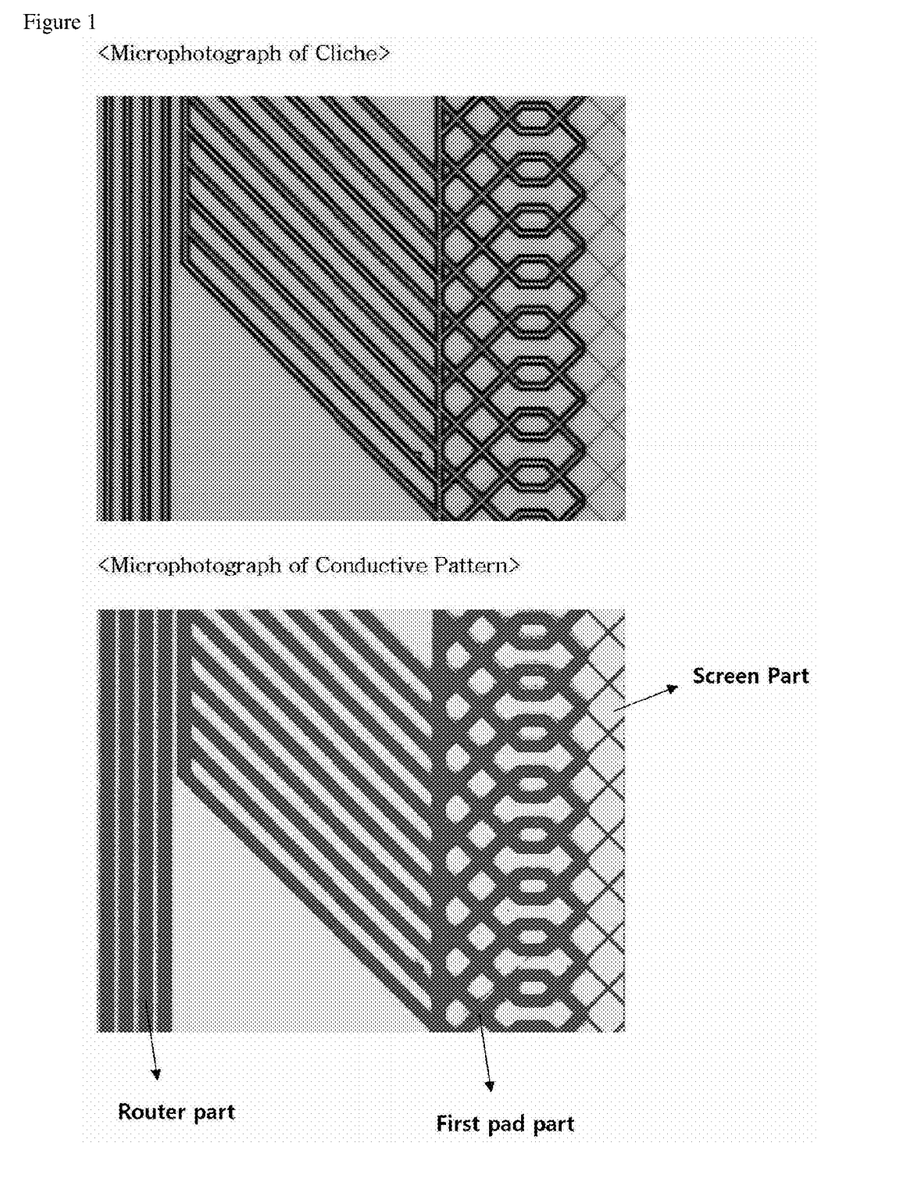
FIG. 1 illustrates an example of a conductive pattern comprised in a router part and a first pad part according to an exemplary embodiment of the present invention.

In the touch panel according to the present invention, the line widths of the first conductive pattern and the second conductive pattern may be the same as each other. As a result, an electrical connection of the first conductive pattern and the second conductive pattern may be more stably performed. FIG. 1 illustrates conductive patterns according to the exemplary embodiment of the present invention.

In the touch panel according to the present invention, the first conductive pattern, the second conductive pattern, and the third conductive pattern each independently may be constituted by straight lines, but may be variously modified to be constituted by curve lines, wave lines, zigzag lines, and the like. Further, the conductive pattern may have a mixed shape of at least two kinds of the lines having the shapes.

In particular, in the related art, all the FPCB connection regions connecting the router part and the flexible printed circuit board (FPCB) part are coated with a conductive material, but in the present invention, the router part and the flexible printed circuit board (FPCB) part may be formed together with the screen part by a printing method by one process, by configuring at least some regions of the FPCB connection regions with the conductive pattern having the opening regions. As a result, the touch panel may be provided at low costs and by a simple process.

Further, in the present invention, all the FPCB connection regions are not coated with the conductive material and configured with the conductive pattern having the opening region, and as a result, adhesion when attaching the second pad part and the FPCB part of the touch panel according to the present invention may be more excellently improved.

In the touch panel according to the present invention, the first conductive pattern, the second conductive pattern, and the third conductive pattern each independently may comprise polygonal patterns of three angles or more, for example, a triangle, a quadrangle, a pentagon, a hexagon, a heptagon or more.

In the touch panel according to the present invention, the first conductive pattern, the second conductive pattern, and the third conductive pattern each independently may comprise a regular pattern. Here, the regular pattern means that the shape of the pattern has regularity. For example, the first conductive pattern, the second conductive pattern, and the third conductive pattern each independently may comprise a pattern having a mesh shape such as a rectangle or a square, or a hexagonal shape.

In the touch panel according to the present invention, the first conductive pattern, the second conductive pattern, and the third conductive pattern each independently may comprise an irregular pattern. Here, the irregular pattern means that the shape of the pattern does not have regularity. Particularly, the third conductive pattern may comprise at least partially an irregular pattern in order to prevent a moire phenomenon.

In the touch panel according to the present invention, the first conductive pattern is the regular pattern and comprises cross points formed by crossing any plurality of lines among lines configuring the conductive pattern, and in this case, the number of cross points may be 3,000 to 122, 500, 13,611 to 30,625, and 19,600 to 30,625 in an area of 3.5 cm×3.5 cm. Further, according to an exemplary embodiment of the present invention, in the case where the number of the cross points is 4,000 to 123,000 when the touch panel is mounted in the display, it was verified that the touch panel has a light characteristic not largely damaging an optical characteristic of the display.

Further, in the touch panel according to the present invention, the first conductive pattern is the irregular pattern and comprises cross points formed by crossing any plurality of lines among lines configuring the conductive pattern. In this case, the number of cross points may be 6,000 to 245,000, 3,000 to 122,500, 13,611 to 30,625, and 19,600 to 30,625 in an area of 3.5 cm×3.5 cm. Further, according to an exemplary embodiment of the present invention, in the case where the number of the cross points is 4,000 to 123,000 when the touch panel is mounted in the display, it was verified that the touch panel has a light characteristic not largely damaging an optical characteristic of the display.

The pitch of the first conductive pattern may be 600 μm or less and 250 μm or less, but may be controlled according to transmittance and conductivity desired by those skilled in the art.

The first conductive pattern used in the present invention is made of preferably a material having specific resistance of $1 \times 10^6$ ohm·cm to $30 \times 10^6$ ohm·cm, and more preferably $7 \times 10^6$ ohm·cm or less.

In the present invention, the first conductive pattern may be an irregular pattern.

The irregular pattern comprises an edge structure of closed figures which are continuously connected to each other, the closed figures having the same shape do not exist within any unit area of 1 cm×1 cm of the irregular pattern, and the number of vertexes of the closed figures may be different from the number of vertexes of quadrangles having the same number as the closed figures. In more detail, the number of vertexes of the closed figures may be larger than the number of vertexes of quadrangles having the same number as the closed figures and may be 1.9 to 2.1 times larger than the number of vertexes of quadrangles, but is not limited thereto.

The closed figures are continuously connected to each other, and for example, in the case where the closed figures are polygons, the adjacent closed figures may share at least one side.

The irregular pattern comprises an edge structure of closed figures which are continuously connected to each other, the closed figures having the same shape do not exist within any unit area of 1 cm×1 cm of the irregular pattern, and the number of vertexes of the closed figures may be different from the number of vertexes of polygons formed by connecting the shortest distances between centers of gravity of the respective closed figures. In more detail, the number of vertexes of the closed figures may be larger than the number of vertexes of polygons formed by connecting the shortest distances between the centers of gravity of the respective closed figures and may be 1.9 to 2.1 times larger than the number of vertexes of polygons, but is not limited thereto.

The irregular pattern comprises an edge structure of closed figures which are continuously connected to each other, the closed figures having the same shape do not exist within any unit area of 1 cm×1 cm of the irregular pattern, and the closed figures may have a value of 50 or more acquired by the following Equation 1.

$$\text{(Standard deviation of distance between vertexes/Average of distance between vertexes)} \times 100 \qquad \text{[Equation 1]}$$

The value of Equation 1 may be calculated within a unit area of the conductive pattern. The unit area may be an area formed by the conductive pattern, for example, 3.5 cm×3.5 cm and the like, but is not limited thereto.

In the present invention, the vertex is defined to mean points in which lines configuring edges of the closed figures of the conductive pattern cross each other.

The irregular pattern may have an edge structure shape of closed figures formed when respective points are connected to the closest points as compared with distances from other points, after any points are disposed in a unit cell which is regularly arranged.

In this case, when irregularity is introduced to a method in which any points are disposed in the regularly arranged unit cell, the irregular pattern may be formed. For example, in the case where the irregularity is given to 0, when the unit cell is a square, the conductive pattern has a square mesh structure, and when the unit cell is a regular hexagon, the conductive pattern has a honeycomb structure. That is, the irregular pattern means a pattern in which the irregularity is not 0.

By the conductive pattern having the irregular pattern shape according to the present invention, it is possible to suppress concentration of lines configuring the pattern, acquire uniform transmittance from a display and equally maintain linear density for a unit area, and secure uniform conductivity.

According to one preferable exemplary embodiment of the present invention, the second conductive pattern and the third conductive pattern are preferably stripe patterns, and the first conductive pattern may comprise the regular pattern, the irregular pattern, or a combination pattern thereof.

When the conductive pattern is prepared, a large-area pattern may also be prepared by using a method of connecting the limited areas repetitively after designing the pattern in the limited area. In order to repetitively connect the patterns, the repetitive patterns may be connected with each other by fixing the positions of the dots of each side. In this case, the limited area is preferably an area of 1 cm2 or more in order to prevent a moire phenomenon due to the regularity and more preferably an area of 5 cm2 or more, but may be selected by those skilled in the art according to a desired area of the conductive pattern.

In order to prepare the conductive pattern, first, after determining a desired pattern shape, the conductive pattern may be formed on the transparent base by using a printing method.

The printing method may be performed by transferring and firing a paste comprising a conductive pattern material on the transparent base in a desired pattern shape. The transferring method is not particularly limited, but the desired pattern may be transferred on the transparent substrate by forming the pattern shape on a pattern transfer medium such as an intaglio or a screen and using the formed pattern shape. A method of forming the pattern shape on the pattern transfer medium may use a known method in the art.

The printing method is not particularly limited and may use a printing method such as offset printing, screen printing, gravure printing, flexo printing, and inkjet printing, and may use a complex method of one kind or more thereof. The printing method may use a roll to roll method, a roll to plate method, a plate to roll method, or a plate to plate method.

Figure 2:
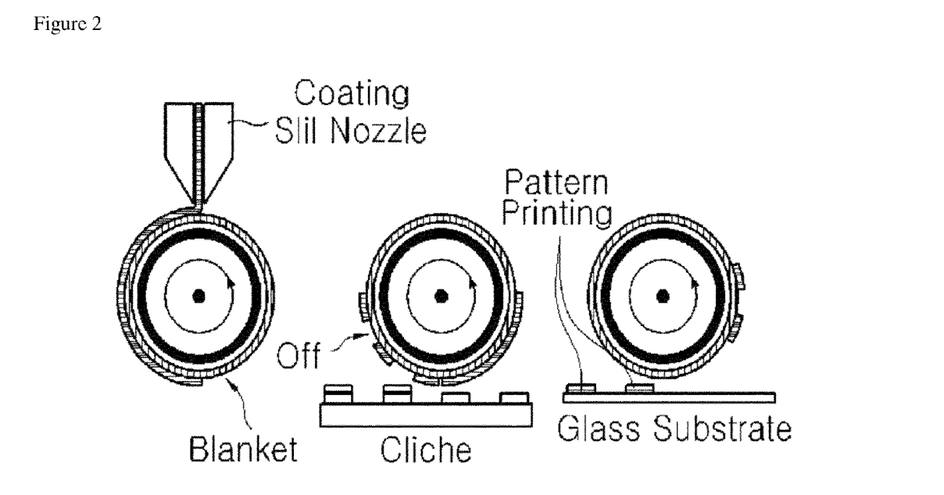
FIGS. 2 and 3 illustrate a process of forming a conductive pattern of a touch panel according to the exemplary embodiment of the present invention.

In the present invention, in order to implement a precise conductive pattern, it is preferable to apply the reverse offset printing method. FIG. 2 illustrates a direct and indirect process using a reverse offset printing method. Referring to FIG. 2, when etching is performed on a silicon-based rubber called a blanket, a method of forming a desired pattern may be performed by coating ink capable of serving as a resist throughout an area, primarily removing an unnecessary portion through an intaglio having a pattern which is called a cliche, and secondarily transferring a print pattern remaining on the blanket to a film where metal and the like are deposited or a base such as glass, and then firing and etching the transferred print pattern. In the case of using the method, as uniformity of a line height in the entire area is secured by using the base with deposited with the metal, it is advantageous that resistance in a thickness direction may be uniformly maintained.

Figure 3:
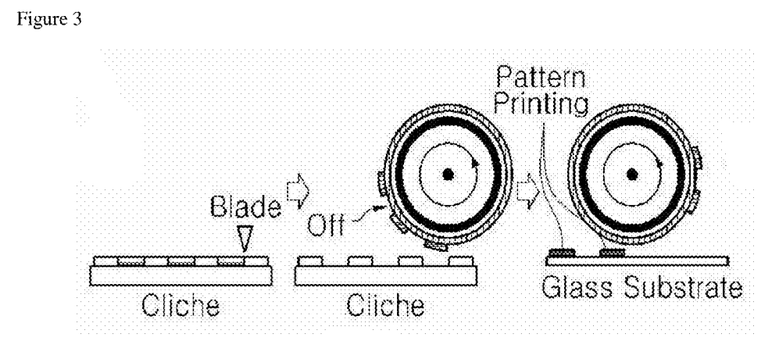

Another example to which the present invention may be applied uses a gravure offset method as illustrated in FIG. 3. The gravure offset printing may be performed by filling a paste in the intaglio having the pattern, primarily transferring the paste to the blanket and then secondarily transferring the paste by contacting the blanket and the transparent base. In addition, the gravure printing may be performed by modifying the gravure offset printing to a method of winding a blanket having the pattern on a roll, filling a paste in the pattern, and then transferring the paste to the transparent base. In the present invention, the methods may be complexly used, in addition to the methods.

According to an exemplary embodiment of the present invention, the first conductive pattern, the second conductive pattern, and the third conductive pattern each independently may be blackened. As a result, even in the case where the conductive pattern is made of a metal material, visibility may be further reduced. In the case of forming a pattern by directly printing a conductive pattern, in order to blacken the conductive pattern, a blackening is performed after adding a blackening material to a paste or ink for forming the conductive pattern, or printing and firing the paste or ink to blacken the conductive pattern.

The blackening material which may be added to the ink or the paste comprises metal oxide, carbon black, carbon nanotube, black pigment, colored glass flit, and the like. The blackening after firing may be performed by immersing in an oxidation solution, for example, a solution containing Fe or Cu ion, immersing in a solution containing halogen ion such as chlorine ion, immersing in peroxide, nitrate, and the like, and a treatment with halogen gas, or the like, in the case where the ink or the paste is an Ag based material.

In the case of a method of forming the pattern through etching, not a method of directly printing a metallic material, another example of the blackening may use a method of depositing a blackening layer on a surface viewed by a person, depositing a layer for providing conductivity thereon, and patterning the layers at once during a post-etching process. As an example, in the case of depositing the blackening layer through MoOxNy, depositing an Al layer thereon, and printing and etching resist ink on the base, MoOxNy and Al are simultaneously patterned in an etchant such as a mixed solution of phosphoric acid, nitric acid, acetic acid, and water and thus a desired surface is blackened.

In the present invention, the first conductive pattern, the second conductive pattern, and the third conductive pattern may be formed on the transparent base. The transparent base is not particularly limited, but light transmittance thereof is 50% or more, preferably 75% or more, and more preferably 88% or more. In detail, the transparent base may use glass, a plastic substrate, or a plastic film. The plastic substrate or film may use a material which is known in the art, for example, a material made of one or more kinds of resins selected from polyacryls, polyurethanes, polyesters, polyepoxies, polyolefins, polycarbonates, and celluloses. In more detail, the plastic substrate or film is preferably a film having visible-light transmittance of 80% or more such as polyethylene terephthalate (PET), polyvinylbutyral (PVB), polyethylene naphthalate (PEN), polyethersulfon (PES), polycarbonate (PC), and acetyl celluloid. A thickness of the plastic film is preferably 12.5 to 500 micrometers, more preferably 50 to 450 micrometers, and much more preferably 50 to 250 micrometers. The plastic substrate may be a substrate having a structure in which various functional layers such as a gas barrier layer for blocking moisture and gas and a hard coat layer for reinforcing strength, improving transmittance, and decreasing a haze value are laminated on one side or both sides of the plastic film. The functional layers which may be comprised in the plastic substrate are not limited to the aforementioned layers, and various functional layers may be provided.

In the present invention, materials of the first conductive pattern, the second conductive pattern, and the third conductive pattern may use metals having excellent electric conductivity. Further, a specific resistance value of the conductive pattern material is preferably 1 microOhm cm to 100 microOhm cm, and more preferably 1 microOhm cm to 5 microOhm cm. A detailed example of the conductive pattern material may comprise one or more kinds selected from a group consisting of metal, metal oxide, metal nitride, metal oxynitride, and a metal alloy. In more detail, the conductive pattern material may comprise one or more kinds selected from a group consisting of Ag, Cu, Cr, Al, Mo, Ni, oxide thereof, nitride thereof, oxynitride thereof, and an alloy thereof. The conductive pattern material may be converted and used into a particle form in the case of directly printing, and in this case, the particle form may be particles having a single composition or a mixed composition of the metals enumerated above.

In the present invention, in the case of using ink or a paste comprising the conductive pattern material, the ink or the paste may further comprise an organic binder in addition to the aforementioned conductive pattern material in order to facilitate the printing process. The organic binder may have volatility during a firing process. The organic binder may comprise a polyacrylic resin, a polyurethane resin, a polyester resin, a polyolefin resin, a polycarbonate resin, a cellulose resin, a polyimide resin, a polyethylene naphthalate resin, a modified epoxy, and the like, but is not just limited thereto.

The touch panel may be connected to a power source, and in this case, a resistance value per unit area considering an aperture ratio is 0.01 ohm/square to 1,000 ohm/square and preferably 5 ohm/square to 150 ohm/square at room temperature.

Further, at least one of an anti-reflective film, a polarization film, and an anti-fingerprinting film may be provided on at least one side of the touch panel according to the present invention. According to a design specification, different kinds of functional films may be further comprised in addition to the aforementioned functional films. The touch panel may be applied to display apparatuses such as an OLED display panel (ODP), a liquid crystal display (LCD), a cathode-ray tube (CRT), and a PDP.

Hereinafter, preferable Examples for understanding the present invention will be described. However, the following Examples just exemplify the present invention, and as a result, the scope of the present invention is not limited to the following Examples.

EXAMPLE

A conductive pattern comprising the FPCB connection region illustrated in FIG. 5 was formed by depositing Al metal on a polyethylene terephthalate (PET) base, forming the conductive pattern through a printing process, and performing etching and releasing processes.

Figure 4:
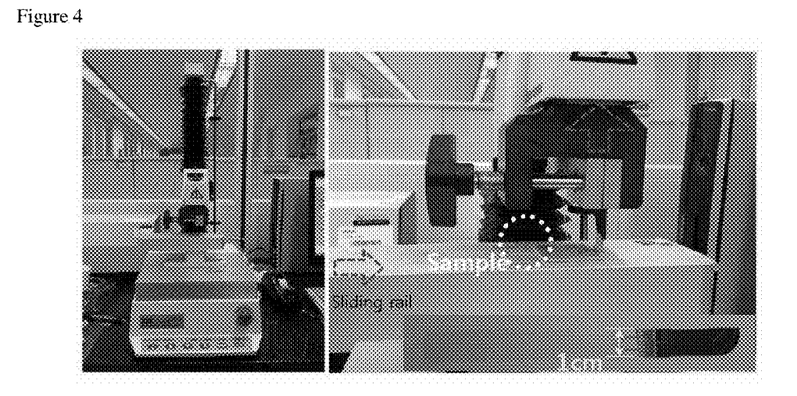
FIG. 4 is a diagram illustrating a device for testing adhesion between a second pad part and an FPCB of the present invention.

As illustrated in the following Table 1, after the FPCB was attached to two kinds of pad part samples comprising the FPCB connection regions having different ratios of the opening regions by using an anisotropic conductive film (ACF'), an adhesion test (peel test) was performed by using Texture Analyzer XT Plus (Speed: 50 mm/min) as illustrated in FIG. 4.

TABLE 1

| Ratio of opening region in FPCB connection region | \multicolumn{6}{c}{Measuring result of adhesion strength} | | | | | |
| --- | --- | --- | --- | --- | --- | --- |
| | 0 | 10% | 30% | 50% | 70% | 90% |
| Example 1 | — | 761 | 772 | 916 | 1,112 | 957 |
| Example 2 | — | 614 | 799 | 995 | 931 | 1,145 |
| Comparative Example 1 | 514 | — | — | — | — | — |
| Comparative Example 2 | 611 | — | — | — | — | — |

As illustrated in the result of Table 1, in the present invention, it can be seen that all the FPCB connection regions connecting the router part and the flexible printed circuit board (FPCB) part are not coated with the conductive material, but configured with the conductive pattern having the opening region, and as a result, adhesion when attaching the touch panel and the FPCB part according to the present invention may be more excellently improved.

The invention claimed is:
1. A touch panel, comprising:
a screen part;
a router part;
a flexible printed circuit board (FPCB) part;
a first pad part comprising two or more router connection regions connecting the screen part and the router part; and
a second pad part comprising two or more FPCB connection regions connecting the router part and the flexible printed circuit board (FPCB) part, wherein at least some regions of the two or more FPCB connection regions comprise a conductive pattern having opening regions,
wherein the opening regions are provided inside of the FPCB connection regions, and
wherein a shape of the opening regions is a closed figure comprising at least one selected from the group consisting of a straight line, a curved line, a wave line and a zigzag line; a polygon; or a circle.

2. The touch panel of claim 1, wherein a ratio of the opening regions in the two or more FPCB connection regions is 10 to 99%.

3. The touch panel of claim 1, wherein at least some regions of the two or more router connection regions comprise a conductive pattern having opening regions.

4. The touch panel of claim 3, wherein a ratio of the opening regions in the two or more router connection regions is 10 to 99%.

5. The touch panel of claim 1, wherein the screen part comprises a first conductive pattern, and the router part and the first pad part comprise second conductive patterns, and at least a part of the second conductive pattern has a line width different from the first conductive pattern.

6. The touch panel of claim 5, wherein a difference in a line width between at least a part of the second conductive pattern and the first conductive pattern is 5 micrometers or more.

7. The touch panel of claim 5, wherein a difference in a line width between at least a part of the second conductive pattern and the first conductive pattern is 15 micrometers or more.

8. The touch panel of claim 5, wherein a difference in a line width between at least a part of the second conductive pattern and the first conductive pattern is 30 micrometers or more.

9. The touch panel of claim 5, wherein a difference in a line width between at least a part of the second conductive pattern and the first conductive pattern is 100 micrometers or less.

10. The touch panel of claim 1, wherein the screen part comprises a first conductive pattern, and the router part and the second pad part comprise third conductive patterns, and at least a part of the third conductive pattern has a line width different from the first conductive pattern.

11. The touch panel of claim 10, wherein a difference in a line width between at least a part of the third conductive pattern and the first conductive pattern is 5 micrometers or more.

12. The touch panel of claim 10, wherein a difference in a line width between at least a part of the third conductive pattern and the first conductive pattern is 15 micrometers or more.

13. The touch panel of claim 10, wherein a difference in a line width between at least a part of the third conductive pattern and the first conductive pattern is 30 micrometers or more.

14. The touch panel of claim 10, wherein a difference in a line width between at least a part of the third conductive pattern and the first conductive pattern is 100 micrometers or less.

15. The touch panel of claim 1, wherein the screen part comprises a first conductive pattern, the router part and the first pad part comprise second conductive patterns, and the second pad part comprises a third conductive pattern, and the first conductive pattern, the second conductive pattern, and the third conductive pattern are formed by performing one printing process.

16. The touch panel of claim 15, wherein the printing process is a reverse offset printing process.

17. The touch panel of claim 1, wherein the screen part comprises a first conductive pattern, the router part and the first pad part comprise second conductive patterns, and the second pad part comprises a third conductive pattern, and the first conductive pattern, the second conductive pattern, and the third conductive pattern each independently contain one kind or more selected from a group consisting of metal, metal oxide, metal nitride, metal oxynitride, and a metal alloy.

18. The touch panel of claim 1, wherein the screen part comprises a first conductive pattern, the router part and the first pad part comprise second conductive patterns, and the second pad part comprises a third conductive pattern, and the first conductive pattern, the second conductive pattern, and the third conductive pattern each independently contain one kind or more selected from a group consisting of Ag, Cu, Cr, Al, Mo, Ni, oxide thereof, nitride thereof, oxynitride thereof, and an alloy thereof.

19. The touch panel of claim 1, further comprising:
an anisotropic conductive film (ACF) connecting the FPCB connection region and the flexible printed circuit board (FPCB) part and comprising a conductive ball,
wherein the shortest distance between the opening regions in the FPCB connection region or the shortest width of an shielded region is equal to or larger than a maximum size of the conductive ball.

20. A display apparatus comprising the touch panel of claim 1.

* * * * *